(12) United States Patent
Sashida

(10) Patent No.: US 8,779,647 B2
(45) Date of Patent: *Jul. 15, 2014

(54) ELECTROSTATIC MOTOR

(75) Inventor: Toshiiku Sashida, Tokyo (JP)

(73) Assignee: Shinsei Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,864

(22) Filed: Jun. 25, 2012

(65) Prior Publication Data

US 2012/0274177 A1 Nov. 1, 2012

Related U.S. Application Data

(62) Division of application No. 12/308,366, filed as application No. PCT/JP2007/061546 on Jun. 7, 2007, now Pat. No. 8,278,797.

(30) Foreign Application Priority Data

Jun. 16, 2006 (JP) ................................. 2006-167247

(51) Int. Cl.
*H02N 1/00* (2006.01)

(52) U.S. Cl.
USPC .......................................................... 310/309

(58) Field of Classification Search
CPC ...................................................... H02N 1/004
USPC ................................................. 310/308–310
See application file for complete search history.

(56) References Cited

U.S. PATENT DOCUMENTS

| | | | |
|---|---|---|---|
| 2,843,767 A * | 7/1958 | Whitlock ...................... | 310/309 |
| 3,094,653 A | 6/1963 | Le May et al. | |
| 3,433,981 A | 3/1969 | Bolee | |
| 3,436,630 A | 4/1969 | Bolee | |

(Continued)

FOREIGN PATENT DOCUMENTS

| | | |
|---|---|---|
| DE | 1 112 570 | 8/1961 |
| EP | 1 557 938 | 7/2005 |

(Continued)

OTHER PUBLICATIONS

Suzuki, JP2001016874A Machine Translation, Jan. 2001.*

(Continued)

*Primary Examiner* — Burton Mullins
*Assistant Examiner* — Eric Johnson
(74) *Attorney, Agent, or Firm* — Wenderoth, Lind & Ponack, L.L.P.

(57) ABSTRACT

An electrostatic motor has a container having a main body, a stator fixed to the main body in the container; and a rotor which is disposed opposite to the stator in the container, and which is pivotally supported so as to freely rotate via a rotating shaft. The stator has first electrodes attached to a first electrode support and second electrodes attached to a second electrode support. The first electrodes and the second electrodes are electrically insulated. The rotor has third electrodes attached to a third electrode support and fourth electrodes attached to a fourth electrode support. The third electrodes and the fourth electrodes are electrically insulated, and the third electrodes and the fourth electrodes are respectively arranged at different positions from the first electrodes and the second electrodes in a radial direction of the rotor so as to be spaced apart from the first electrodes and the second electrodes.

16 Claims, 8 Drawing Sheets

(56) References Cited

U.S. PATENT DOCUMENTS

| | | |
|---|---|---|
| 6,163,098 A | 12/2000 | Taylor et al. |
| 6,353,276 B1 | 3/2002 | Gendron |
| 2005/0264617 A1 | 12/2005 | Nishimura et al. |
| 2006/0097672 A1 | 5/2006 | Koga et al. |

FOREIGN PATENT DOCUMENTS

| | | |
|---|---|---|
| FR | 2 658 960 | 8/1991 |
| JP | 63-087181 | 4/1988 |
| JP | 08-066058 | 3/1996 |
| JP | 8-88984 | 4/1996 |
| JP | 10-155285 | 6/1998 |
| JP | 2001-016874 | 1/2001 |
| JP | 2007-143299 | 6/2007 |

OTHER PUBLICATIONS

Suzuki, JP10155285 Machine Translation, Jun. 1998.*
Supplementary European Search Report issued Jun. 4, 2012 in corresponding European Application No. 07 74 4875.
International Search Report issued Sep. 11, 2007 in corresponding International (PCT) Application No. PCT/JP2007/061546.
Sugano, JP 08-066058A Machine Translation, Mar. 1996.

* cited by examiner

MOVEMENT TIMING OF ELECTRODE 44B
RELATIVE TO ELCTRODE 34B

ELECTROSTATIC MOTOR

CROSS-REFERENCE TO RELATED APPLICATION

This application is a divisional of U.S. application Ser. No. 12/308,366, filed May 6, 2009, now U.S. Pat. No. 8,278,797 which is a National Stage application of PCT/JP2007/061546, filed Jun. 7, 2007, the entireties of which are incorporated herein by reference.

BACKGROUND OF THE INVENTION

I. Technical Field

The present invention relates to an electrostatic motor that rotationally drives using electrostatic force, and in particular to an electrostatic motor that rotationally drives by generating a high electric field in a vacuum.

II. Background Art

Most conventional electric motors use electromagnetic force generated by a coil and magnet. Electrostatic motors that rotationally drive using electrostatic force are also known (e.g., Japanese Patent Application Laid-Open No. 8-88984, and Study of Servo System using Electrostatic Motors written by Akio Yamamoto et al.)

However, conventional electric motors using electromagnetic force generated by a coil and magnet produce gas in a vacuum, breaking up the vacuum. In addition, since conventional electric motors use magnetic materials, they cannot be operated in strong magnetic fields.

Conventional electrostatic motors, as described above, also produce gas in a vacuum, breaking up the vacuum. In conventional electrostatic motors, the electric field is increased by placing a large number of pairs of electrodes on an insulator so that the electrodes are closely spaced. However, this method is prone to dielectric breakdown, creeping discharge, spark discharge, and other concerns. Accordingly, a strong electric field cannot be generated, and sufficient driving force cannot be produced. Therefore, practical electrostatic motors have not yet been realized.

SUMMARY OF THE INVENTION

The present invention has been made in view of the foregoing drawbacks. Accordingly, an object of this invention is to provide an electrostatic motor that generates a strong electric field in a vacuum so that it can rotationally drive with sufficient driving force.

Another object of the present invention is to provide an electrostatic motor designed so as to prevent dielectric breakdown, creeping discharge, spark discharge, and the like to operate in a strong electric field, and also to be lightweight.

In order to solve the foregoing problems, an electrostatic motor according the present invention has the characteristics described below.

A first aspect of the invention is an electrostatic motor characterized in that a disc-shaped stator and a disc-shaped rotor are disposed opposite each other in a vacuum container such that the stator is fixed to the main body of the vacuum container and the rotor is pivotally supported on the main body of the vacuum container so as to freely rotate via a rotating shaft; the stator has first electrodes and second electrodes electrically insulated by an insulator and attached to electrode supports so as to alternate along the circumferences of the electrode supports; the rotor has first electrodes and second electrodes electrically insulated by an insulator and attached to electrode supports so as to alternate along the circumferences of the electrode supports; the first and second electrodes on the stator side are each arranged at a spacing of two or more rows at a predetermined distance from the center of the rotating shaft; the first and second electrodes on the rotor side are each arranged at a predetermined distance from the center of the rotating shaft, and intermediate between the rows of the first and second electrodes on the stator side; predetermined electric fields are applied to the first and second electrodes on the stator side; and voltages of different polarities are applied to the first and second electrodes on the rotor side so as to be switched according to predetermined timing.

A second aspect of the invention is the electrostatic motor of the first aspect described above, characterized in that the first and second electrodes on the stator side and the first and second electrodes on the rotor side are each pin-shaped and are each arranged parallel to the axial direction of the rotating shaft.

A third aspect of the invention is the electrostatic motor of the first or second aspect described above, characterized in that the electrode supports of the first and second electrodes on the stator side, and the electrode supports of the first and second electrodes on the rotor side are insulatively supported by the insulators respectively so as to allow sufficient creepage distance.

A fourth aspect of the invention is the electrostatic motor of any one of the first to third aspects described above, characterized in that the insulators on the stator side and the rotor side each have one or a plurality of grooves formed thereon.

A fifth aspect of the invention is the electrostatic motor of any one of the first to fourth aspects described above, characterized in that the ends of the first and second electrodes on the stator side and the ends of the first and second electrodes on the rotor side are round in shape.

A sixth aspect of the invention is the electrostatic motor of any one of the first to fifth aspects described above, characterized in that stainless steel is used for metallic components disposed in the vacuum container and inorganic insulator is used as insulating components.

A seventh aspect of the invention is the electrostatic motor of any one of the first to sixth aspects described above, characterized in that a nonmagnetic material is used as the metallic components disposed in the vacuum container.

An eighth aspect of the invention is the electrostatic motor of any one of the first to seventh aspects described above, comprising an encoder including a slit plate and a sensor that detect the relative position between the first and second electrodes on the stator side and the first and second electrodes on the rotor side.

A ninth aspect of the invention is the electrostatic motor of any one of the first to eighth aspects described above, characterized in that a gas-absorbing material is deposited on components disposed in the vacuum container.

The present invention adopts the foregoing configuration in which the first and second electrodes attached to the electrode supports of the stator and the rotor are located within the vacuum. Accordingly, unlike a conventional electrostatic motor in which groups of electrodes are supported by an insulator or insulators, the present invention prevents dielectric breakdown even if there is a strong electric field between the electrodes. This results in output as high as or higher than that obtained by an electromagnetic motor. Accordingly, an electrostatic motor that generates a strong electric field in the vacuum such that it can rotationally drive with sufficient driving force can be provided. An electrostatic motor that can drive in a high, clean vacuum is applicable, for example, in semiconductor manufacturing apparatuses. In addition, the electrostatic motor is free from windage loss, thus offering improved efficiency. Moreover, an electrostatic motor that drives in a strong electric field generated between the electrodes allows practical applications including small or large motors, and achieves high output and weight reduction.

In the present invention, the electrode supports are insulatively supported and grooves are formed in the insulator, allowing sufficient distance for creepage. Accordingly, an electrostatic motor effectively prevents dielectric breakdown, creeping discharge, spark discharge, and other concerns, and generates a strong electric field.

Additionally, in the electrostatic motor according to the present invention, a stainless steel etc. or an inorganic insulator that produce less residual gas, such as porcelain or glass, are used as components. Therefore, the electrostatic motor can be used in the clean vacuum. Further, using a nonmagnetic material as a metallic components results in a nonmagnetic motor, which can be used in a strong magnetic field.

Furthermore, the electrostatic motor according to the present invention uses no heavy magnetic materials as metallic components and is therefore lighter in weight than conventional ones.

DETAILED DESCRIPTION OF THE INVENTION

Embodiments of an electrostatic motor according to the present invention will be described in detail hereinafter.

Figure 1:
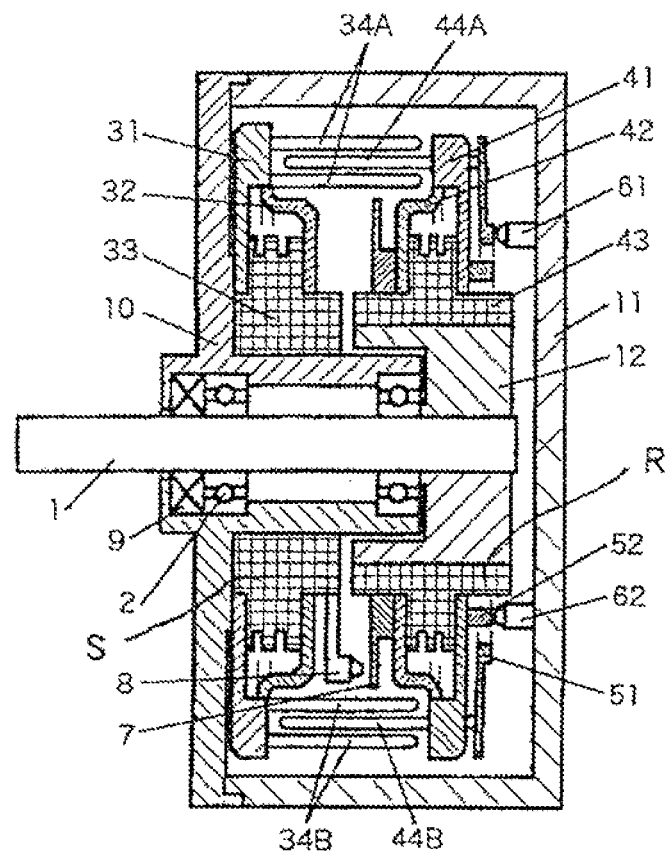
FIG. 1 shows a vertical section of an electrostatic motor according to the first embodiment of the present invention.
Figure 2:
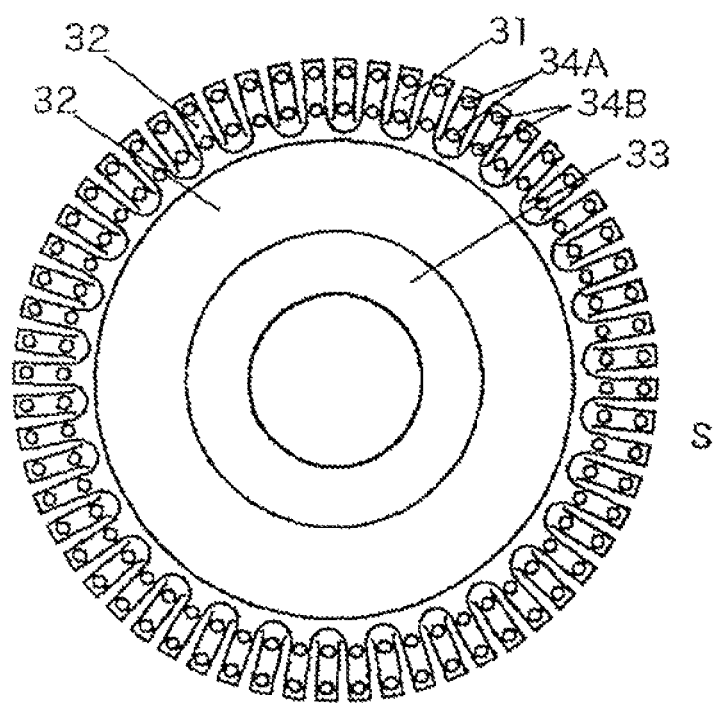
FIG. 2 is a plan view of a stator in the first embodiment.
Figure 3:
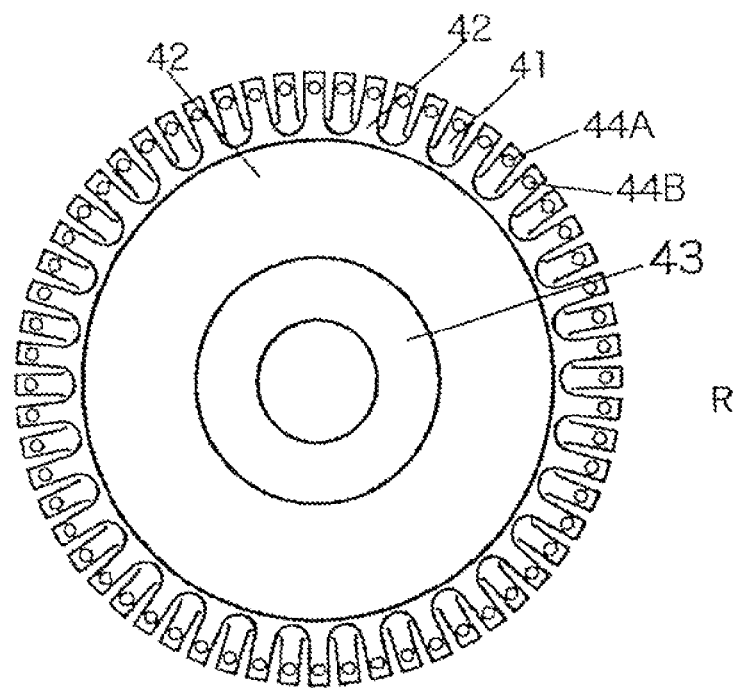
FIG. 3 is a plan view of a rotor in the first embodiment.
Figure 4:
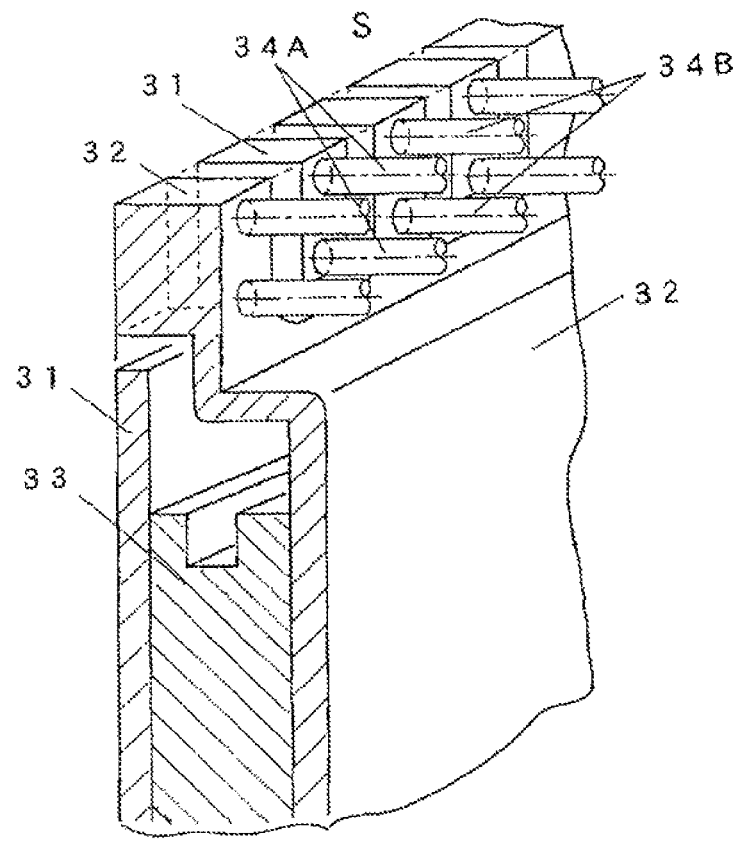
FIG. 4 is a partially-detailed schematic view of first and second electrodes of the stator in the first embodiment.

FIG. 1 shows a vertical section of an electrostatic motor according to the first embodiment of the present invention. FIG. 2 is a plan view of a stator in the first embodiment, and FIG. 3 is a plan view of a rotor in the first embodiment. FIG. 4 is a partially-detailed schematic view of the first and second electrodes of the stator in the first embodiment.

In an electrostatic motor according to the first embodiment, disc-shaped stator S and disc-shaped rotor R are disposed opposite to each other in vacuum container 11, and stator S is fixed to the main body of the vacuum container 11. The electrostatic motor in the first embodiment is operable in the vacuum of 3 Pa or less.

In the electrostatic motor in this embodiment, first electrodes 34A are fixed to electrode supports 31 on the stator S side. The first electrodes 34A are arranged in two rows at a predetermined distance from the center of rotating shaft 1 (i.e., the center of motor base 10). Similarly, second electrodes 34B are fixed to other electrode supports 32 on the stator S side. As shown in FIGS. 2 and 4, the first electrodes 34A and the second electrodes 34B are arranged so as to alternate. The first and second electrodes 34A, 34B are disposed along the circumferences of the electrode substrates 31, 32 respectively at regular intervals parallel to the rotating shaft 1 such that the first and second electrodes 34A, 34B are radially fixed in two rows. The electrode supports 31, 32 with the first and second electrodes 34A, 34B respectively are fixed on an insulator 33, which is mounted on the motor base 10 (i.e., the main body of the vacuum container 11). The insulator 33 provides sufficient insulating thickness and creepage distance, and has a plurality of grooves formed to prevent creeping discharge. Here, sufficient insulating thickness should be equal to or greater than the breakdown voltage of the insulator, and sufficient creepage distance is several times or more larger than this thickness. The number of grooves, groove shape, groove depth, and other characteristics, may be set as needed according to the size and application of the electrostatic motor.

On the other hand, a first electrode 44A is fixed to each of the electrode supports 41 on the rotor R side. These first electrodes 44A are arranged in one row at a predetermined distance from the center of the rotating shaft 1. Also, disposed on each of the other electrode supports 42, on the rotor R side is a second electrode 44B. As shown in FIG. 3, the first electrodes 44A and the second electrodes 44B are arranged so as to alternate like those on the stator S side. The first and second electrodes 44A, 44B are disposed along the circumferences of the electrode supports 41, 42 respectively at regular intervals parallel to the rotating shaft 1 such that the first and second electrodes 44A, 44B are radially fixed in one row. The electrode supports 41, 42 with the first and second electrodes 44A, 44B respectively are fixed on an insulator 43, which is mounted on the rotating shaft 1. As on the stator S side, the insulator 43 provides sufficient insulating thickness and creepage distance, and has a plurality of grooves formed to prevent creeping discharge. The number of grooves, groove shape, groove depth, and other characteristics may be set as needed according to the size and application of the electrostatic motor.

As described above, the first and second electrodes 44A, 44B on the rotor R side are fixed on the supports 41, 42 respectively at regular intervals parallel to the rotating shaft 1, like the first and second electrodes 34A, 34B on the stator S side. However, as shown in FIG. 1, the positions of the first and second electrodes 44A, 44B on the rotor R side from the center of the rotating shaft 1 are in the middle of the rows of the first and second electrodes 34A and 34B on the stator S side so that the rotor R is rotationally drivable. The first electrode 34A, second electrode 34B, first electrode 44A and second electrode 44B are pin-shaped. It is preferable that the ends of the electrodes are round in order to prevent discharge between them. The shape of these electrodes, however, is not limited to pin-shape.

Power is supplied to the electrodes 44A, 44B on the rotor R side through slip rings 51, 52 and brushes 61, 62.

An encoder is composed by adopting an optical system (i.e., a slit plate 7 and a sensor 8) or a magnetic system (i.e., a magnetic disc and a sensor). In this embodiment, the former is used. The timing of the supply of power to the first and second electrodes 44A, 44B on the rotor R side is detected by the sensor 8, and the detected result is subjected to signal processing by a drive circuit (not shown). A high voltage (approximately 1 to 100 kV) is outputted and supplied to the first and second electrodes 44A, 44B.

When the electrostatic motor is used in air or gas, a vacuum seal 9 is attached to the motor base 10 in order to maintain the vacuum within the electrostatic motor.

The present invention uses an electrostatic motor that operates in the vacuum. The present invention, needless to say, functions as an electrostatic motor even in insulation gas such as SF6 gas.

In the description above, the first and second electrodes 34A and 34b respectively on the stator S side are arranged in two rows, whereas the first and second electrodes 44A and 44b respectively on the rotor R side are arranged in one row. However, as described below, the number of rows is not limited to only one, as two or more rows may also be set.

Additionally, in the first embodiment, stainless steel or the like that produce less residual gas may be used as metallic components that are placed in the vacuum container 11 (e.g., the first and second electrodes 34A, 34B, electrode supports 31, 32, first and second electrodes 44A, 44B, and electrode supports 41, 42). Also, an inorganic insulator such as porcelain or glass, which produces less residual gas, may be used as an insulating components. The usability of the electrostatic motor in the clean vacuum can thereby be ensured. It is also effective to deposit a gas absorbing material (i.e., gettering substance), such as titanium, vanadium, tantalum, or zirconium, on components used in the vacuum container 11.

In the first embodiment, using a nonmagnetic material as the metallic components used in the vacuum container 11 enables a nonmagnetic motor that can be used in a strong magnetic field. Additionally, no heavy magnetic material is used as the metallic components, thus contributing to weight reduction as well.

Figure 5:
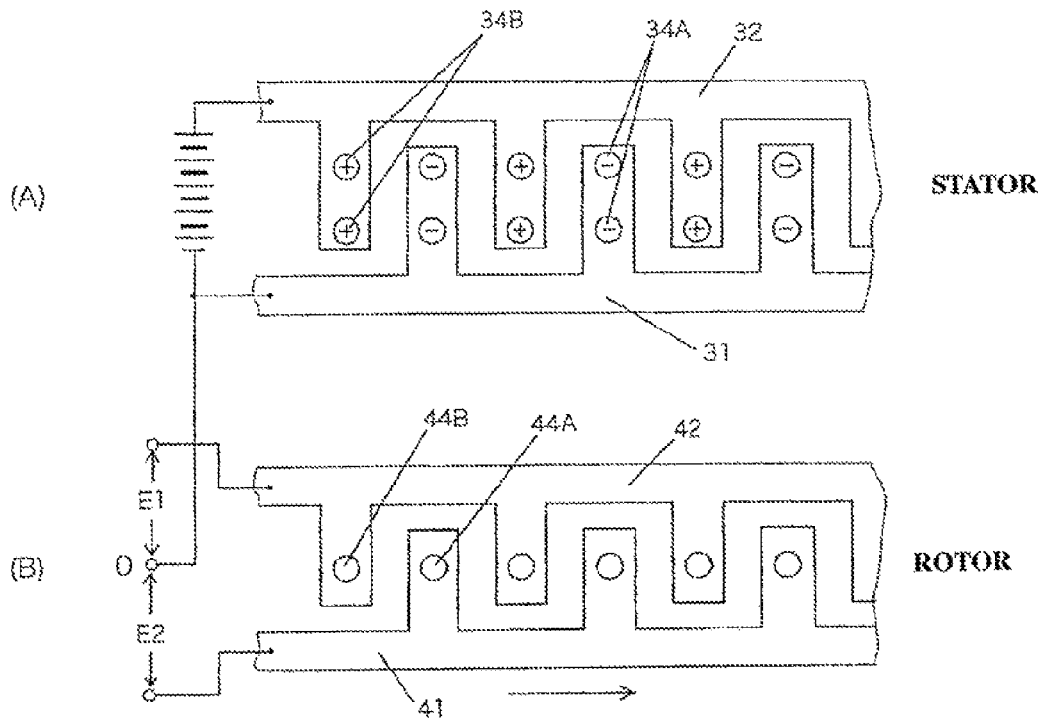
FIG. 5(A) is a development vertical partial view of electrode supports and first and second electrodes on the stator side in the first embodiment.
FIG. 5(B) is a development vertical partial view of the electrode supports and first and second electrodes on the rotor side in the first embodiment.

The principles of operation of the electrostatic motor according to the first embodiment, which has the foregoing configuration, will now be explained. As shown in FIG. 5(A), by applying a high voltage (approximately 1 to 100 kV) between the electrode supports 31, 32 on the stator S side, a high electric field (1 to 100 kV/mm or so) is generated between the first and second electrodes 34A, 34B.

Since the electrostatic motor is configured so that the first and second electrodes 44A, 44B on the rotor R side freely move along the circumference between the first and second electrodes 34A, 34B on the stator S side, the first and second electrodes 44B, 44A are positively and negatively charged respectively by applying a high positive voltage (1 to 100 kV or so) to the electrode supports 42. In terms of charge timing, the direction of thrust (i.e., rotating force) is, for example, determined by where the electrodes 44B on the rotor R side are located relative to the second electrodes 34B on the stator S side. Therefore, the magnitude and time of the voltage greatly affect the magnitude of the thrust (rotating force).

Figure 6:
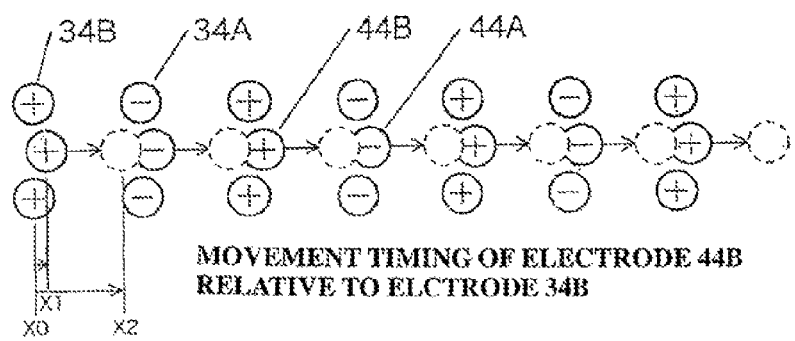
FIG. 6 illustrates the principle of action of the first and second electrodes on the stator side and the first and second electrodes on the rotor side in the first embodiment.

FIG. 6 illustrates the principle of the action of the electrostatic motor by showing only the first and second electrodes 34A, 34B on the stator S side and the first and second electrodes 44A, 44B on the rotor R side. For instance, when each of the second electrodes 44B on the rotor R side has reached a location (i.e., location X1) that is slightly to the right of the location X0 of the second electrode 34B on the stator S side, a positive potential is applied to the second electrode 44B. Thereby, repulsion force occurs between the second electrodes 34B and the second electrode 44B, whereas attractive force occurs between the first electrodes 34A and the second electrode 44B. Consequently, the rotor R connected to the first and second electrodes 44A, 44B is subject to a driving force toward the right and moves accordingly.

The voltage of each of the second electrodes 44B switches to a location (i.e., location X2) that is immediately before first electrodes 34A. Second electrode 44B repeats this switching operation each time the positional timing of the second electrode 44B is detected by the signal of the encoder sensor 8.

Figure 7:
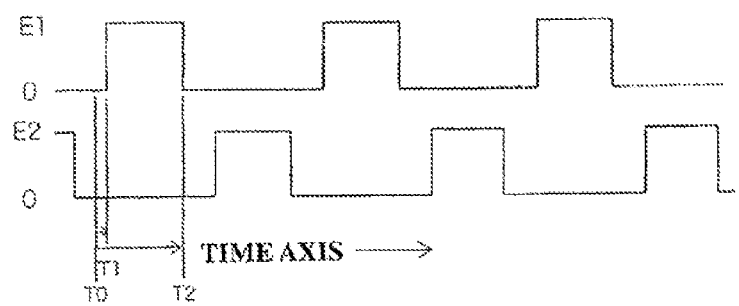
FIG. 7 shows the voltage waveforms of the first and second electrodes on the rotor side in the first embodiment.

FIG. 7 shows the voltage waveforms of the first and second electrodes 44A, 44B on the rotor R side (wherein T0 represents the time at location X0, and T1 and T2 represent times at locations X1 and X2 respectively).

Next, an electrostatic motor according to the second embodiment of the present invention will be described.

Figure 8:
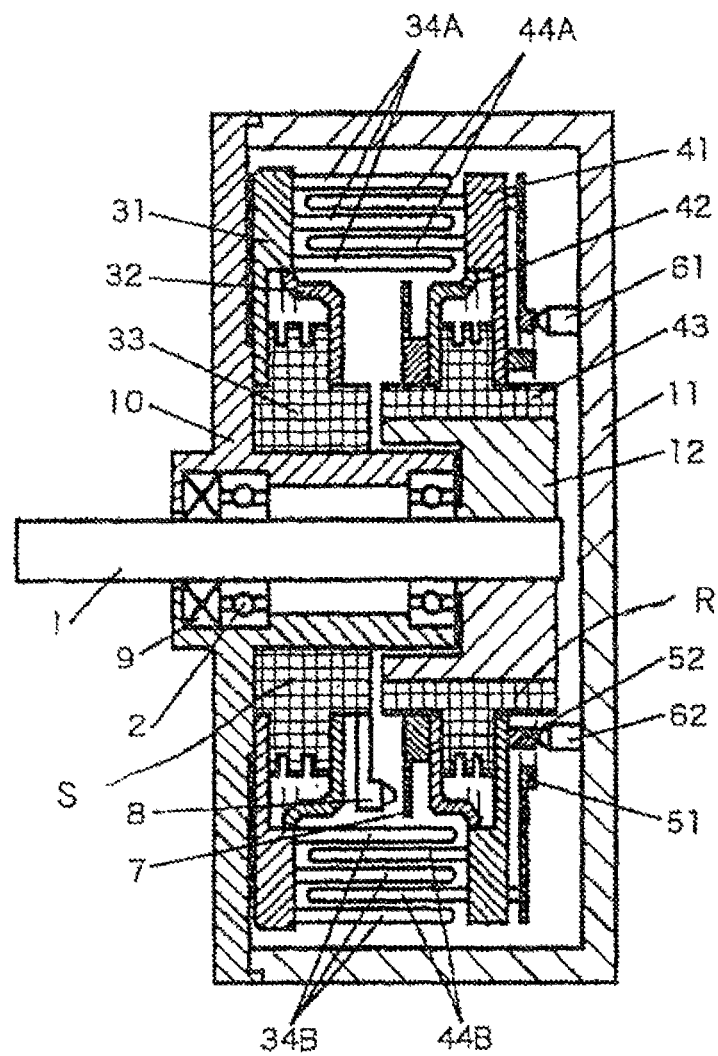
FIG. 8 shows a vertical section of an electrostatic motor according to the second embodiment.

FIG. 8 shows a vertical section of an electrostatic motor according to the second embodiment. In FIG. 8, elements identical to those in the illustrations of the first embodiment are labeled with the same symbols and duplicate explanation of these elements is avoided.

In the second embodiment, three rows of first electrodes 34A and three rows of second electrodes 34B are disposed along the circumferences of electrode supports 31, 32 respectively, on the stator S side. Similarly, two rows of first electrodes 44A and two rows of second electrodes 44B are disposed along the circumferences of electrode supports 41, 42 respectively. In the second embodiment, an electrostatic motor with a high output is produced by increasing the number of electrodes.

Next, an electrostatic motor according to the third embodiment of the present invention will be described.

Figure 9A:
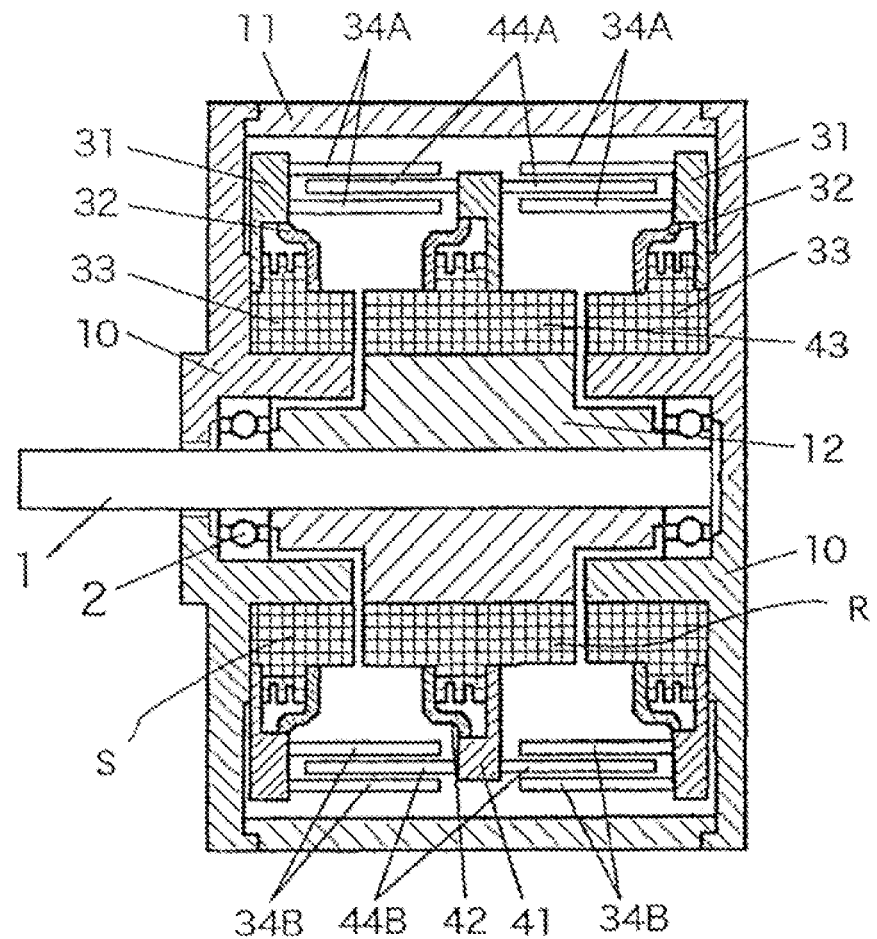
FIGS. 9A and 9B show a vertical section of an electrostatic motor according to the third embodiment.
Figure 9B:
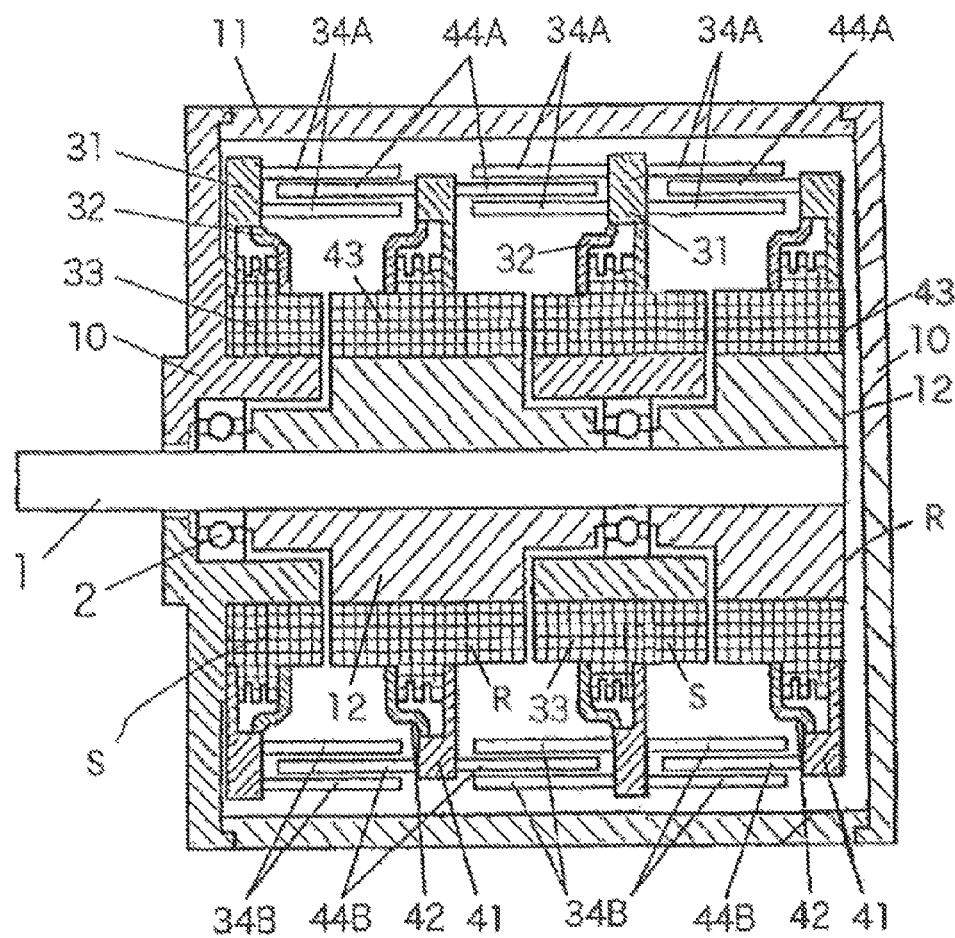

FIG. 9 shows a vertical section of the electrostatic motor according to the third embodiment. In FIG. 9, elements identical to those in the illustrations of the first embodiment are labeled with the same symbols and duplicate explanation of these elements is avoided. The encoder, the slip rings, and the brushes are not shown.

In the first and second embodiments, limitations resulting from a cantilever structure impede any unnecessary increase in electrode length. In the third embodiment, first electrodes 44A are extended from both sides of each of electrode supports 41 on the rotor R side, and second electrodes 44B are also extended from both sides of each of electrode supports 42 on the rotor R side (see FIG. 9A). This allows an output that is twice as high as that of an electrostatic motor with cantilever structured electrodes in the first embodiment. In addition, the first and second electrodes 34A, 34B may be extended from both sides of the electrode supports 31 and 32, respectively, on the stator S side, and the rotors R and stators S may be stacked in more than one stage in an axial direction (see FIG. 9B).

Next, an electrostatic motor according to the fourth embodiment of the present invention will be described.

Figure 10:
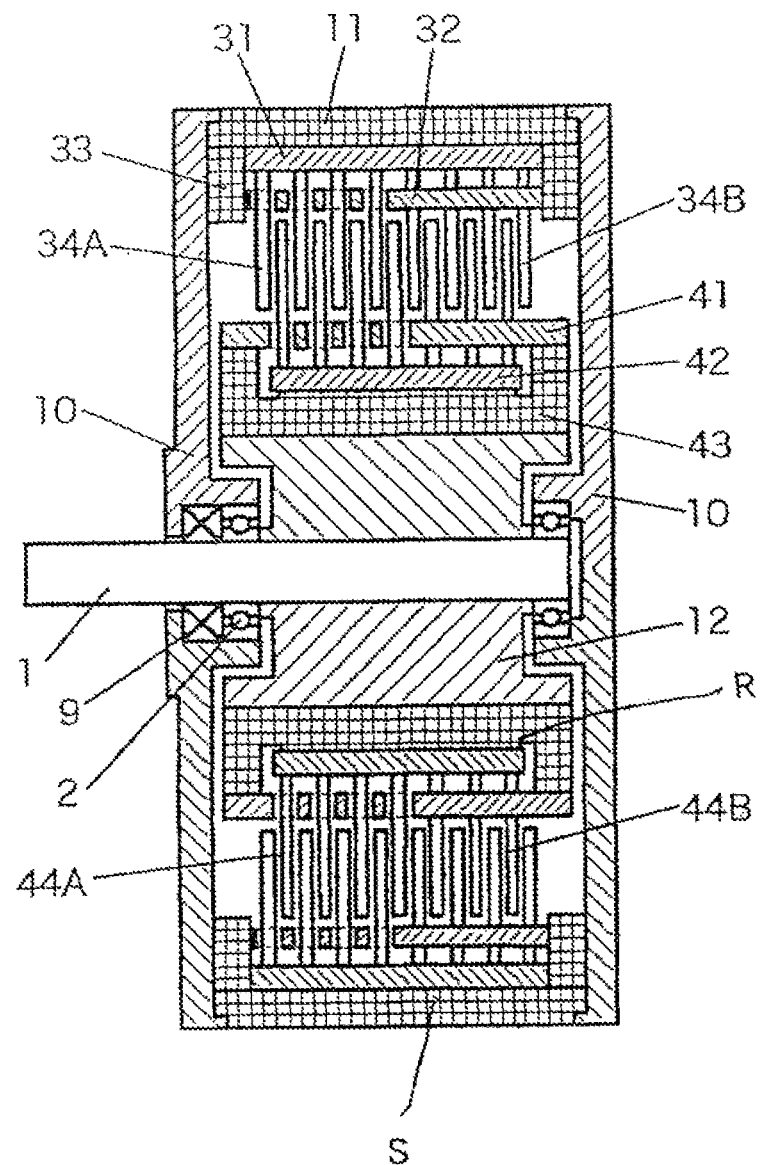
FIG. 10 shows a vertical section of an electrostatic motor according to the fourth embodiment, in which first and second electrodes on the stator side and first and second electrodes on the rotor side are radially arranged with respect to the center of a rotating shaft.
Figure 11:
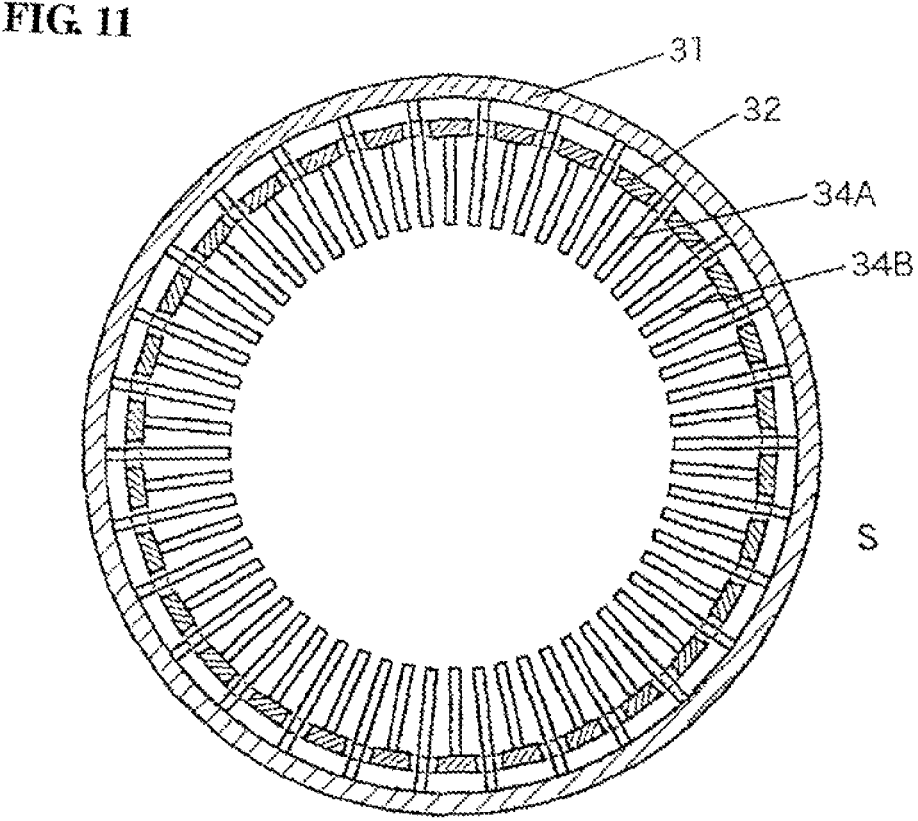
FIG. 11 is a sectional view of the stator in the fourth embodiment.
Figure 12:
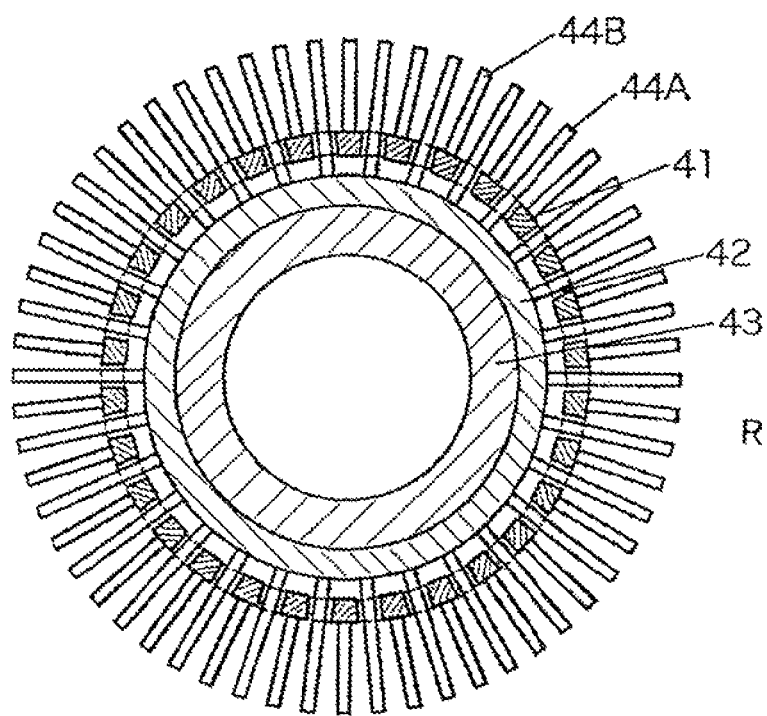
FIG. 12 is a sectional view of the rotor in the fourth embodiment.

FIG. 10 shows a vertical section of the electrostatic motor according to the fourth embodiment, in which first and second electrodes on the stator side and first and second electrodes on the rotor side are radially arranged with respect to the center of the rotating shaft. FIGS. 11, 12 show vertical section of the stator and rotor, respectively, according to the fourth embodiment. Also in FIGS. 10 to 12, elements identical to those in illustrations of the first embodiment are labeled with the same symbols and duplicate explanation of these elements is avoided. The encoder, the slip rings, and the brushes are not shown.

However, in the fourth embodiment, the positional relations between the electrode supports 31, 32, insulator 33, first and second electrodes 34A, 34B on the stator S side, and the electrode supports 41, 42, insulator 43, and first and second electrodes 44A, 44B on the rotor R side, differ from those in the first to third embodiments.

In the fourth embodiment, first electrodes 44A are passed through the comparatively large holes of a pipe-like electrode support 41, then firmly inserted, toward the axis, into the pipe-like electrode support 42 with many holes, and thus fixed in position. Second electrodes 44B are fixed to the electrode support 41. Similarly, first and second electrodes 34A, 34B are fixed to the electrode supports 31, 32, respectively, along the axis. The electrode supports 31, 32 are fixed to a motor base 10 or the body of a vacuum container 11 via the insulator 33. The electrode supports 41, 42 are connected to a rotating body 12 and a rotating shaft 1 via an insulator 43.

The configuration in the fourth embodiment ensures effects as excellent as those in the first to third embodiments.

The invention claimed is:

1. An electrostatic motor comprising:
   a rotating shaft;
   a container having a main body;
   a stator fixed to the main body in the container; and
   a rotor disposed opposite to the stator in the container, and being pivotally supported so as to freely rotate via the rotating shaft,
   wherein the stator has first and second electrode supports, and first electrodes supported by the first electrode support and second electrodes supported by the second electrode support,
   the first electrode support and the second electrode support are fixed to a first insulator so as to extend from the first insulator in a radial outward direction of the rotor at an outer side of the first insulator,
   the first electrodes and the second electrodes are electrically insulated,
   the rotor has third and fourth electrode supports, and third electrodes supported by the third electrode support and fourth electrodes supported by the fourth electrode support,
   the third electrode support and the fourth electrode support are fixed to a second insulator so as to extend from the second insulator in the radial outward direction of the rotor at an outer side of the second insulator, and
   the third electrodes and the fourth electrodes are electrically insulated, and the third electrodes and the fourth electrodes are respectively arranged at different positions from the first electrodes and the second electrodes in the radial direction of the rotor so as to be spaced apart from the first electrodes and the second electrodes.

2. The electrostatic motor according to claim 1, wherein the first electrodes and the second electrodes are each arranged in two or more rows, and
   the third electrodes and the fourth electrodes are each arranged intermediately between the rows of the first electrodes and the second electrodes.

3. The electrostatic motor according to claim 1, wherein the electrostatic motor is configured to apply predetermined electric fields between the first electrodes and the second electrodes, and
   apply voltages of different polarities to the third electrodes and the fourth electrodes so as to be switched at a predetermined timing.

4. The electrostatic motor according to claim 1, wherein the first electrodes, the second electrodes, the third electrodes and the fourth electrodes are each rod-shaped and protrude in a direction parallel to an axial direction of the rotating shaft.

5. The electrostatic motor according to claim 1, wherein the first electrodes, the second electrodes, the third electrodes and the fourth electrodes have round ends.

6. The electrostatic motor according to claim 1, wherein at least one groove is disposed on an outer periphery of the first insulator.

7. The electrostatic motor according to claim 1, wherein at least one groove is disposed on an outer periphery of the second insulator.

8. The electrostatic motor according to claim 1, further comprising:
   another stator arranged in the container.

9. The electrostatic motor according to claim 8, wherein the rotor is arranged between the stator and the other stator.

10. The electrostatic motor according to claim 1, further comprising:
    another rotor arranged in the container.

11. An electrostatic motor comprising:
    a rotating shaft;
    a container having a main body;
    a stator fixed to the main body in the container; and
    a rotor disposed opposite to the stator in the container, and being pivotally supported so as to freely rotate via the rotating shaft,
    wherein the stator has first and second electrode supports, and first electrodes supported by the first electrode support and second electrodes supported by the second electrode support,
    the first electrode support and the second electrode support are fixed to a first insulator so as to extend in a direction parallel to an axial direction of the rotating shaft and the first electrode support is at a radially outer position, with respect to the rotating shaft, as compared to the second electrode support,
    the first electrodes and the second electrodes are electrically insulated, the rotor has third and fourth electrode supports, and third electrodes supported by the third electrode support and fourth electrodes supported by the fourth electrode support, the third electrode support and the fourth electrode support are fixed to a second insulator so as to extend in the direction parallel to the axial direction of the rotating shaft and the third electrode support is at a radially outer position, with respect to the rotating shaft, as compared to the fourth electrode support, and
    the third electrodes and the fourth electrodes are electrically insulated, and the third electrodes and the fourth electrodes are respectively arranged at different positions from the first electrodes and the second electrodes in the direction parallel to the axial direction of the rotating shaft so as to be spaced apart from the first electrodes and the second electrodes.

12. The electrostatic motor according to claim 11, wherein the first electrodes and the second electrodes are each arranged in two or more rows, and
    the third electrodes and the fourth electrodes are each arranged intermediately between the rows of the first electrodes and the second electrodes.

13. The electrostatic motor according to claim 11, wherein the electrostatic motor is configured to apply predetermined electric fields between the first electrodes and the second electrodes, and apply voltages of different polarities to the third electrodes and the fourth electrodes so as to be switched at a predetermined timing.

14. The electrostatic motor according to claim 11, wherein the first electrodes, the second electrodes, the third electrodes and the fourth electrodes are each rod-shaped and protrude in a radial direction of the rotor.

15. The electrostatic motor according to claim 14, wherein the first electrodes protrude toward the rotor through holes disposed in the second electrode support.

16. The electrostatic motor according to claim 14, wherein the fourth electrodes protrude toward the stator through holes disposed in the third electrode support.

* * * * *